(12) United States Patent
Tollefsrud et al.

(10) Patent No.: US 11,793,106 B2
(45) Date of Patent: Oct. 24, 2023

(54) AGRICULTURAL APPLICATION IMPLEMENT WITH A LIFTABLE BIN

(71) Applicant: CNH Industrial America LLC, New Holland, PA (US)

(72) Inventors: Aaron Robert Tollefsrud, Willmar, MN (US); David Hafvenstein, Benson, MN (US); Sunil Vetal, Westmont, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 433 days.

(21) Appl. No.: 16/736,219

(22) Filed: Jan. 7, 2020

(65) Prior Publication Data

US 2021/0204469 A1 Jul. 8, 2021

(51) Int. Cl.
*A01C 7/20* (2006.01)
*A01C 15/00* (2006.01)

(52) U.S. Cl.
CPC ............ *A01C 7/208* (2013.01); *A01C 15/006* (2013.01)

(58) Field of Classification Search
CPC ......... A01C 7/208; A01C 15/006; A01C 7/20; A01C 7/00; A01C 15/005; A01C 15/00; B60P 1/06; B60P 1/08; B60P 1/30; B60P 1/32; B60P 1/34; B60P 1/56
See application file for complete search history.

(56) References Cited

U.S. PATENT DOCUMENTS

| 3,279,801 A | * | 10/1966 | Meyer ................. A01C 15/006 239/651 |
| 3,474,924 A | | 10/1969 | Wheeler |
| 3,474,935 A | * | 10/1969 | Bauers ................ A01C 15/003 222/627 |

(Continued)

FOREIGN PATENT DOCUMENTS

| CN | 101966971 B | | 2/2011 | |
| CN | 103004313 | * | 4/2013 | ............. A01B 51/00 |

(Continued)

OTHER PUBLICATIONS www.Parallax.com—4-Directional Tilt Sensor (#28036)—https://www.parallax.com/sites/default/files/downloads/28036-4-Directional-Tilt-Sensor-v1.0.pdf (Dec. 20, 2010).

*Primary Examiner* — Christopher J. Novosad
(74) *Attorney, Agent, or Firm* — Rebecca Henkel; Rickard DeMille

(57) ABSTRACT

An agricultural application implement for delivering particulate product to a field. The implement includes a frame, a bin to hold product, a pneumatic conveying system fixed to the frame, a metering system operably connected between the supply compartment and the pneumatic conveying system, and a bin lift system. The pneumatic conveying system includes an airflow source to provide an airflow, and a delivery line operably connected to the airflow source and to the bin. The delivery line includes a plurality of outlets. The metering system meters product with the airflow to result in a mixed flow of airflow and product for the delivery line.

(Continued)

The bin lift system includes hydraulic cylinders coupling the bin to the frame, and a bin lift controller to control the hydraulic cylinders to raise or lower the bin.

19 Claims, 10 Drawing Sheets

(56) References Cited

U.S. PATENT DOCUMENTS

| | | | | |
|---|---|---|---|---|
| 5,761,985 | A * | 6/1998 | Stoll | F15B 15/1414 92/165 PR |
| 5,951,233 | A * | 9/1999 | Boucher | B60P 1/025 187/253 |
| 6,705,595 | B2 | 3/2004 | Belley et al. | |
| 7,140,516 | B2 * | 11/2006 | Bothor | B65B 69/0075 222/173 |
| 9,273,478 | B2 * | 3/2016 | Carr | B66D 1/00 |
| 9,353,582 | B2 | 5/2016 | De Mul et al. | |
| 2004/0017281 | A1 | 1/2004 | Dix | |
| 2005/0076818 | A1 * | 4/2005 | Grimm | A01C 23/024 111/119 |
| 2009/0145121 | A1 * | 6/2009 | Yasuda | B60W 10/06 60/431 |
| 2010/0293611 | A1 * | 11/2010 | Ablabutyan | A61G 3/062 726/17 |
| 2015/0060707 | A1 * | 3/2015 | Baasch | F16K 31/54 251/59 |
| 2016/0095276 | A1 | 4/2016 | Roberge et al. | |
| 2017/0083020 | A1 * | 3/2017 | Purwin | G06Q 10/087 |
| 2018/0338413 | A1 * | 11/2018 | Connell | A01B 63/008 |
| 2018/0343792 | A1 | 12/2018 | Roberge et al. | |
| 2019/0021215 | A1 | 1/2019 | Roberge et al. | |
| 2019/0023504 | A1 | 1/2019 | Roberge et al. | |
| 2020/0137957 | A1 * | 5/2020 | Friesen | B65G 53/66 |
| 2021/0009213 | A1 * | 1/2021 | Komiya | B62D 49/00 |

FOREIGN PATENT DOCUMENTS

| | | | | |
|---|---|---|---|---|
| CN | 105522545 | B | | 9/2013 |
| CN | 103613047 | B | | 3/2014 |
| CN | 104743470 | A | | 7/2015 |
| CN | 106089862 | B | | 11/2016 |
| CN | 106986276 | B | | 7/2017 |
| CN | 107200287 | B | | 9/2017 |
| CN | 107696938 | | * 2/2018 | ............. B60P 1/02 |
| CN | 206985612 | U | | 2/2018 |
| CN | 108862111 | A | | 11/2018 |
| CN | 110239414 | | * 9/2019 | ............. B60P 1/02 |
| DE | 4339050 | A1 | * 11/1994 | ............. A01C 7/08 |
| EP | 0763459 | | * 3/1997 | ............. B60P 1/02 |
| EP | 1351840 | A1 | * 10/2003 | ............. B60P 1/02 |
| FR | 2705630 | A1 | * 12/1994 | ............. B60P 1/02 |
| GB | 801630 | | * 9/1958 | ............. B60P 1/02 |
| JP | 3115420 | B2 | | 1/1994 |
| JP | 2003-164207 | | * 6/2003 | ........... A01C 15/006 |
| WO | WO-9720109 | A1 | * 6/1997 | ........... A01C 15/006 |
| WO | WO-2010150290 | A1 | * 12/2010 | ............. B60P 1/02 |

* cited by examiner

AGRICULTURAL APPLICATION IMPLEMENT WITH A LIFTABLE BIN

FIELD OF THE INVENTION

The invention relates generally to an agricultural product delivery applicator for applying particulate material such as seed, fertilizer, herbicide, or insecticide to a field, and more particularly an agricultural application implement with a liftable bin and a method of controlling the same.

BACKGROUND OF THE INVENTION

Agricultural product delivery applicators (or systems) are known to utilize various mechanisms, including mechanical and pneumatic systems, to assist in the movement and delivery of particulate material or product. Example product that can be delivered include fertilizer, seed, insecticide, or herbicide. The product can move from a product bin through an interior passage provided by a series of elongate tubes, which extend from the product supply chamber to a product applicator. The applicator places the product on or in growing medium, such as soil. Such agricultural product delivery systems are commonly employed in planters, air drills, fertilizer and pesticide applicators, and a variety of other agricultural implements.

Agricultural application implements that employ an agricultural product delivery applicator are known to have the product supply bin associated with a metering system. The product is metered from the bin into a set of distribution channels for application to the soil. A pneumatic source, such as a fan or blower, provides air to convey and distribute material through the distribution channels.

Over time the applicator may need to be worked on by the operator. This includes components directly underneath the product supply bin. For example, an operator may want to have access to the metering system below the bin to replace bearings or to reconfigure/replace a metering wheel. Another reason to lift the bin may be to empty the contents of the chamber via a gravity chute, instead of distributing the contents out of the bin via the booms. An improved, safe, cost-effective means for lifting the bin is desired.

BRIEF SUMMARY OF THE INVENTION

In one aspect, the invention provides an agricultural application implement for delivering particulate product to a field. The implement includes a frame, a bin to hold product, a pneumatic conveying system fixed to the frame, a metering system operably connected between the supply compartment and the pneumatic conveying system, and a bin lift system. The pneumatic conveying system includes an airflow source to provide an airflow, and a delivery line operably connected to the airflow source and to the bin. The delivery line includes a plurality of outlets. The metering system meters product with the airflow to result in a mixed flow of airflow and product for the delivery line. The bin lift system includes four hydraulic cylinders coupling the bin to the frame, and a bin lift controller to control the four hydraulic cylinders to raise or lower the bin.

In another aspect, the invention provides a method of moving a bin of an agricultural application implement. The method includes receiving an input to raise or lower the bin, determining a position of the bin, determining a position of a stationary portion of the implement, and individually controlling a plurality of hydraulic cylinders to move the bin in a parallel relationship with respect to the stationary portion of the implement.

Numerous additional objects, aspects, and advantages of the present invention will be made apparent from the following detailed description taken together with the drawing figures.

DETAILED DESCRIPTION OF THE INVENTION

Preferred exemplary embodiments of the invention are illustrated in the accompanying drawings in which like reference numerals represent like parts throughout. In the drawings.

DETAILED DESCRIPTION OF THE INVENTION

Figure 1:
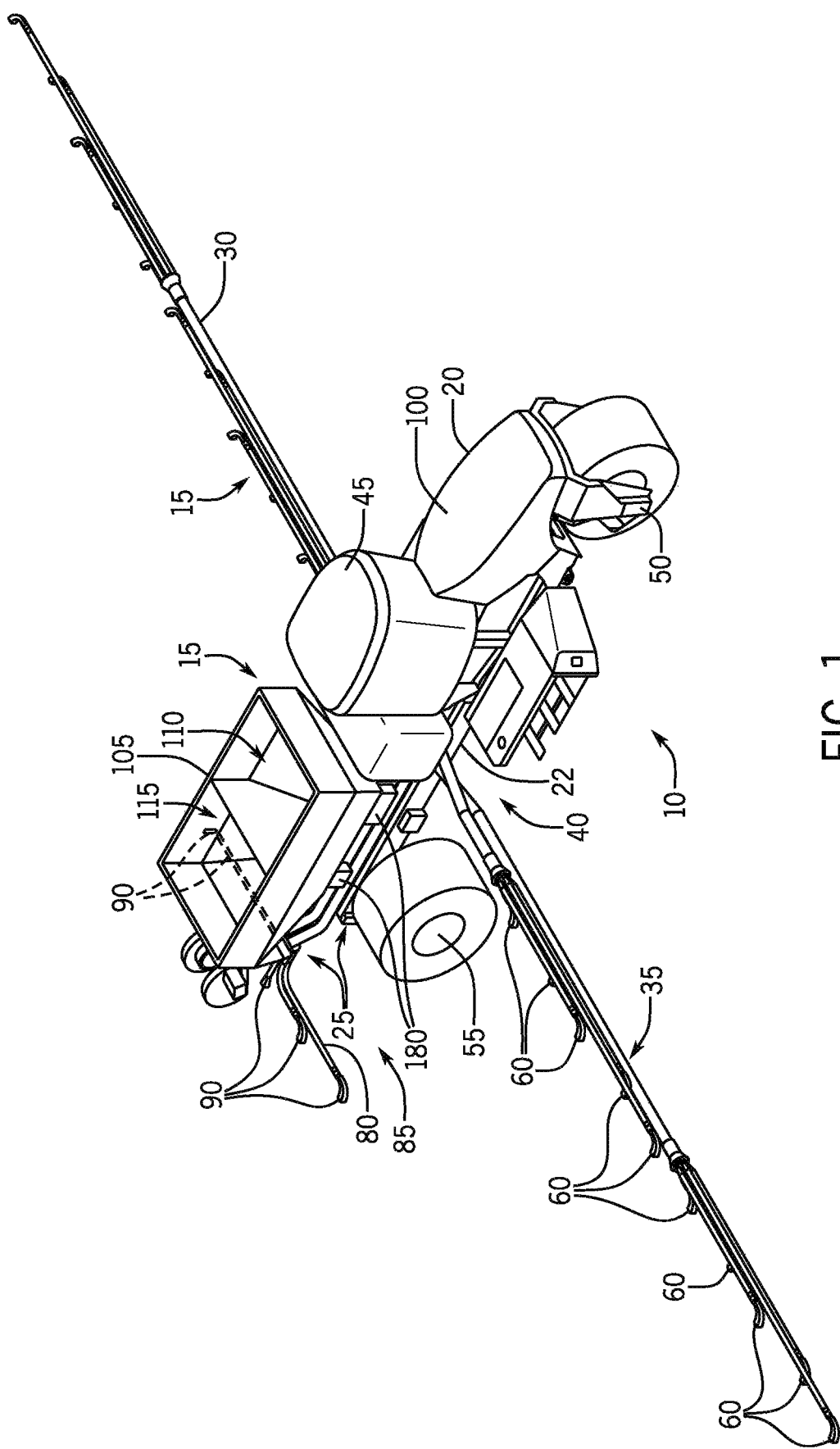
FIG. 1 is an isometric view of an agricultural application implement having a pneumatic conveying system according to one exemplary embodiment of the invention.

An agricultural application implement 10 (or simply implement 10) incorporating aspects of the invention is shown in FIG. 1. In the exemplary embodiment shown, the implement 10 includes an agricultural product delivery applicator 15 (or simply applicator 15), which is shown as a granular fertilizer applicator. As is known in the art, the implement 10 generally includes a transport unit 20, such as a truck, tractor, or trailer, having a chassis or frame 22. The applicator 15 can be formed integrally with or separately from the transport unit 20. The applicator 15 includes a pneumatic conveying system 25 supported by the frame 22.

The applicator 15 includes left and right laterally extending booms 30 and 35, respectively, extending at a mid-implement location 40. Left and right are referred to herein as viewed by the operator housed in the operator cab 45. The mid-implement location 40 refers to a mounting of the booms 30 and 35 between the front and rear axles 50 and 55, respectively, of the transport unit 20. The laterally extending booms 30 and 35 include a support structure (not shown for simplicity) and can be pivoted to a stowed position close to the implement 10 for storage or transport. Each boom 30 and 35 includes a plurality of boom conduits or tubes (discussed further below) terminating at respective outboard ends in in the applicator 15. The outboard ends of the booms 30 and 35 include a spreading outlet 60 or nozzle. In the exemplary embodiment shown, boom 35 includes ten outlets 60.

The pneumatic conveying system 25 also includes a laterally extending offset boom 80. The offset boom 80, which may also be referred to as a secondary boom, is mounted at a rearward location 85. The rearward location 85 refers to a mount of the offset boom 80 behind the rear axle 55. The offset boom includes six rear outlets 90. The offset boom 80 in combination with the booms 30 and 35 provide complete coverage across the width of applicator 15.

The shown transport unit 20 is self-propelled by an engine in an engine compartment 100 and includes the operator cab 45. For the shown construction, an uncovered bin 105 includes compartments (or chambers) 110 and 115 for carrying particulate material to be distributed to and disbursed by the applicator 15. One of the compartments, e.g., compartment 115, can be provided to supply micro-nutrients or other materials. The supply of particulate material in compartments 110 and 115 can be replenished periodically.

Before proceeding, some aspects of the applicator 15 can be a matter of design choice to someone skilled in the art. For example, the number, arrangement, and design of the compartments 110 and 115 and outlets 60 and 90 can vary. The applicator 15 is illustrative of the types of equipment on which the pneumatic conveying system 25 can be used; however, it should be understood that the pneumatic conveying system 25 may, of course, be employed in conjunction with other agricultural equipment such as tillage, seeding, or planting devices and is useful in distributing particulate material other than fertilizer.

Figure 2:
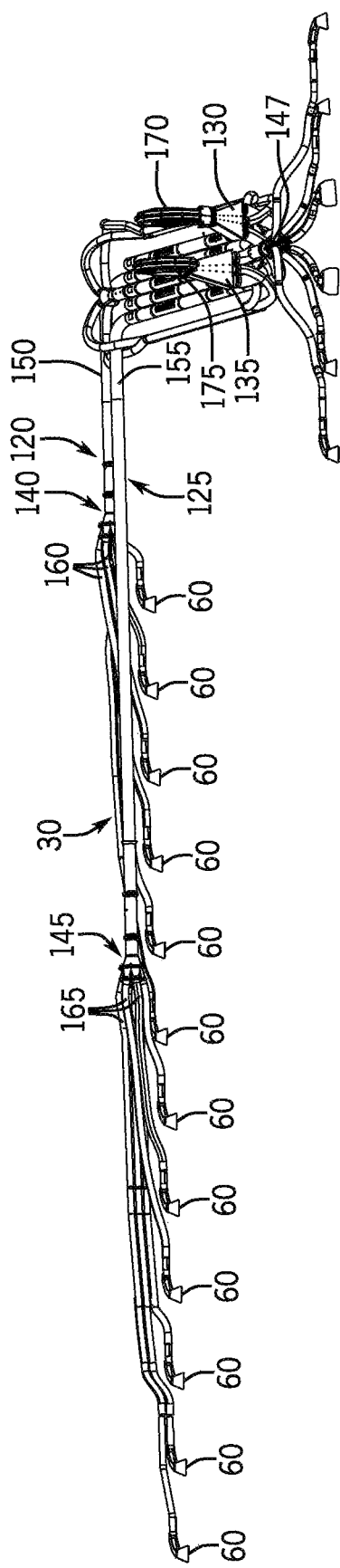
FIG. 2 is a partially broken away isometric view of a portion of the pneumatic conveying system of the implement in FIG. 1.
Figure 3:
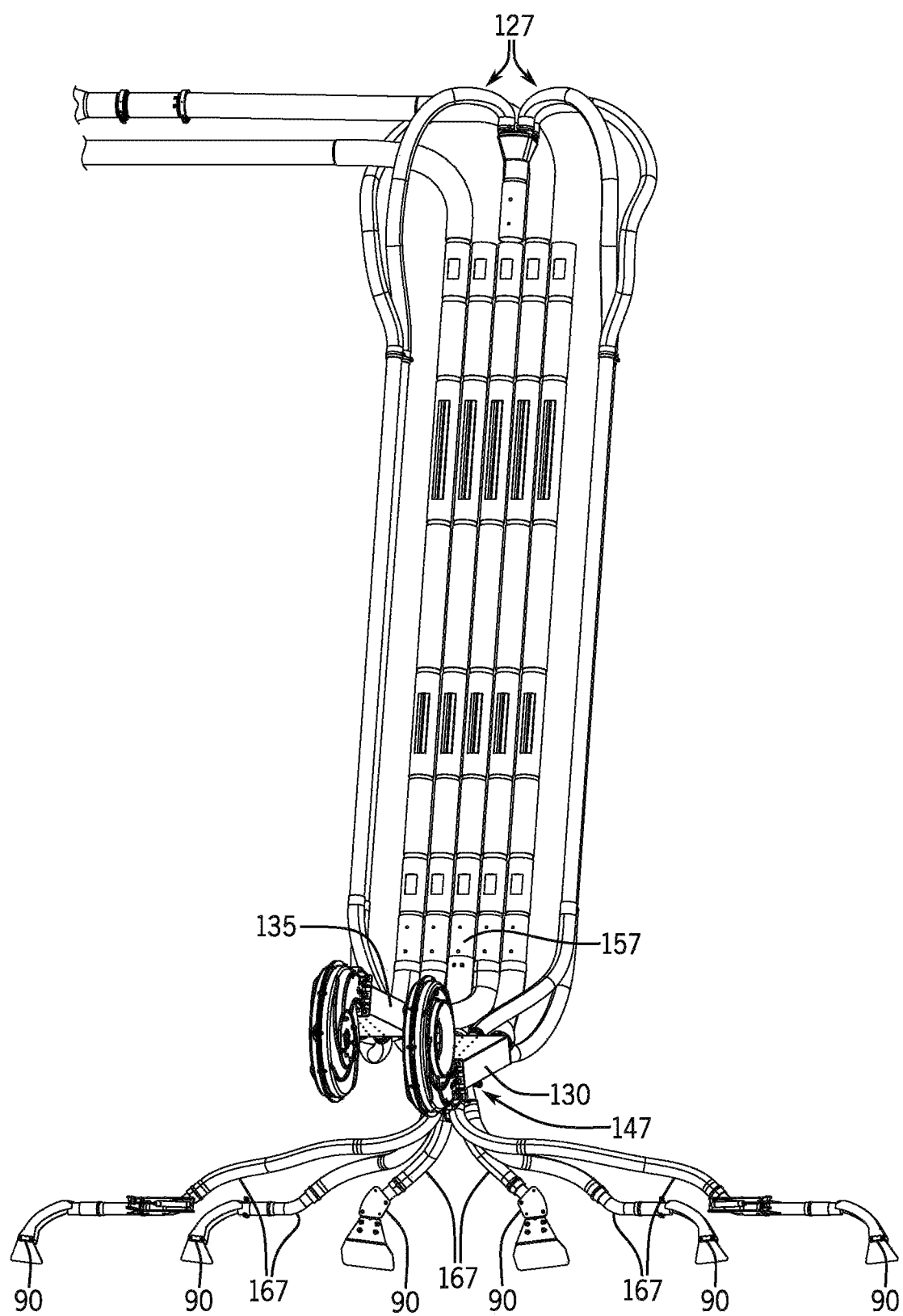
FIG. 3 is a partially broken away isometric view of a second portion of the pneumatic conveying system of the implement in FIG. 1.

The shown construction includes compartments 110 and 115 of the bin 105 being disposed above portions of the pneumatic conveying system 25. FIG. 2 shows a portion of the system 25 delivering to the left laterally extending boom 30. A portion of the pneumatic conveying system 25 delivering to the right laterally extending boom 35 is similar to, but symmetrically opposite from, the portion shown in FIG. 2, and consequently is not shown in detail. FIG. 3 shows a portion of the pneumatic conveying system 25 delivering to the offset boom 80. With reference to FIGS. 2 and 3, the system 25 includes delivery lines 120, 125, and 127 that extend from a plenum 130 and 135 at one end, and terminate at the outlets 60 and 90 at the other end. Through the delivery lines 120, 125, or 127, the fluid and the product are transported therein and are to be split by a distributor assembly 140, 145, or 147. The distributor assembly 140, 145, or 147 divides or distributes a fluid-particulate combination from a supply line 150, 155, or 157 into a number of smaller distribution lines 160, 165, or 167 that are connected to the outlets 60 and 90. Further discussion regarding various distributor assemblies can be found in US Patent Application Publication No. 2018/0343792 A1.

To collect and drive the particulate material along the delivery lines 120, 125 and 127, are one or more pressurized air flow sources. For the shown construction, blowers 170 and 175 are operably connected to the plenums 130 and 135. The air flow from the blowers 170 and 175 is directed from the blowers 170 and 175 into the plenums 130 and 135, then the supply lines 150, 155, and 157, through the distributor assemblies 140, 145, and 147, into the distribution lines 160, 165, and 167, and out the outlets 60 and 90. As the airflow passes through the supply lines 150, 155, and 157, a metering system 180 (FIG. 1) entrains product from the compartments 110 and/or 115 into the airflow. The airflow and entrained product continues to flow along the delivery lines 120, 125, and 127 to the outlets 60 and 90.

Figure 4:
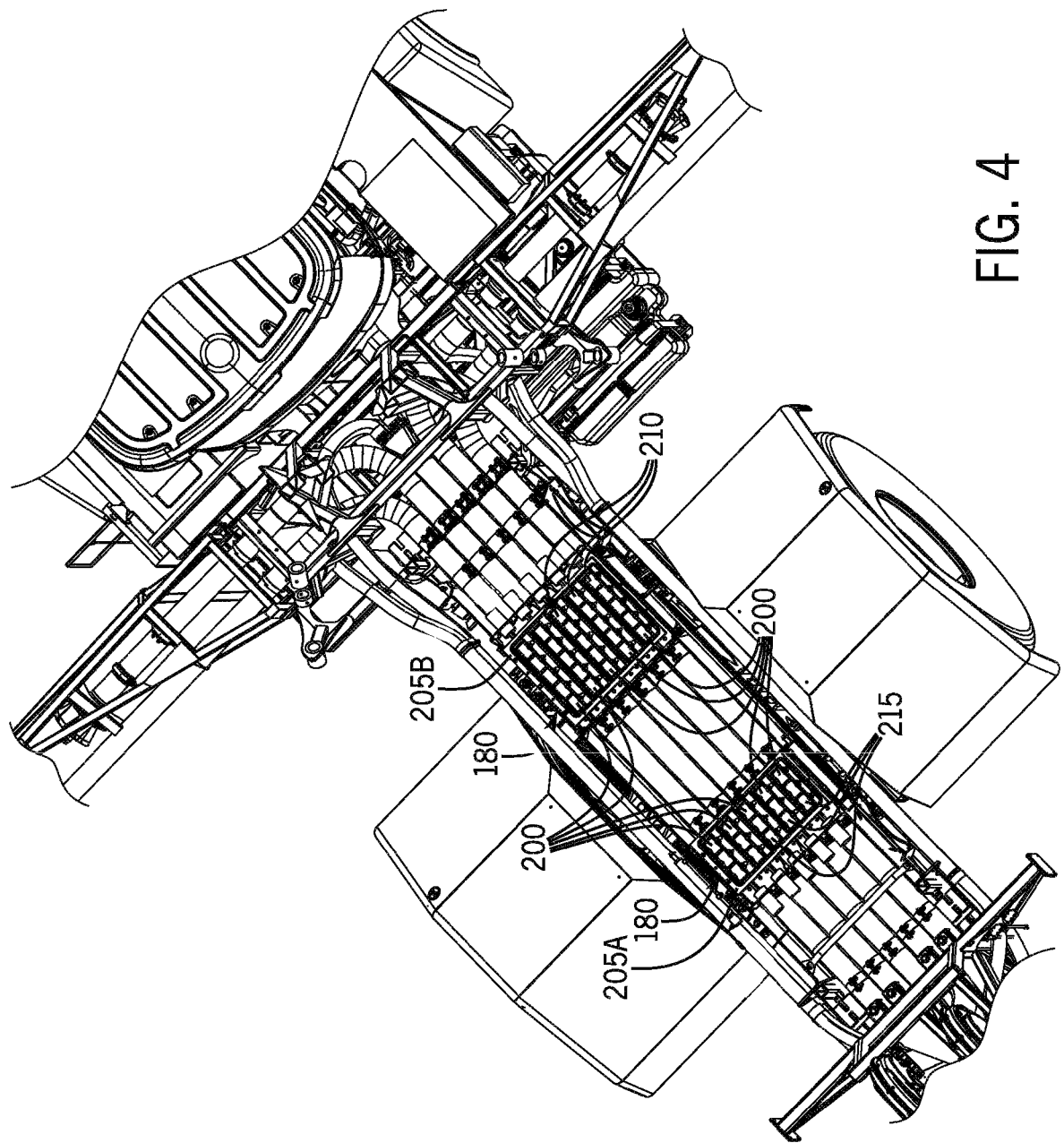
FIG. 4 is a top view of a portion of the agricultural application implement of FIG. 1 with a bin of the implement removed.

Referring now to FIGS. 1 and 4, the particulate contained within each of the compartments 110 and 115 is introduced into the airflow in the delivery lines 120, 125, and 127 via an airtight inline product metering system 180, which are formed of a number of metering devices 200 that function to meter the product flowing from the compartments 110 and 115 into each line.

In the exemplary embodiment of FIG. 4, the metering devices 200 forming the inline metering system 180 are disposed in sets 205A and 205B located directly beneath each compartment 110 and 115. Each set 205A and 205B of metering devices 200 is associated with one compartment 110 or 115. The metering devices 200 are connected in alignment with apertures 210 formed in the metering system 180 to enable particulate material to enter the metering devices 200 and with openings in the delivery lines 120, 125, and 127 to enable the product to be dispensed from the metering devices 200 into the delivery lines 120, 125, and 127. The number of metering devices 200 forming each set 205A and 205B corresponds to the number of 120, 125, and 127 in the pneumatic conveying system 25, such that the product from each compartment 110 and 115 can be dispensed into each delivery line utilizing the same set 205A and 205B 205A and 205B of metering devices 200. For the shown construction, each metering device 200 includes a metering wheel 215, a motor, and a shaft connecting each metering wheel 215 to its respective motor. A moveable gate may be coupled to the bin to prevent flow of product when the bin is raised. The motor can be an electric or hydraulic motor that operates to rotate the shaft and the metering wheel 215 at a desired speed to meter the flow of the particulate material through the metering device 200 into the delivery lines 120, 125, and 127. Further discussion regarding exemplary metering systems and metering devices can be found in US Patent Application Publication No. 2019/0021215 A1, the content of which is incorporated herein by reference.

Figure 5:
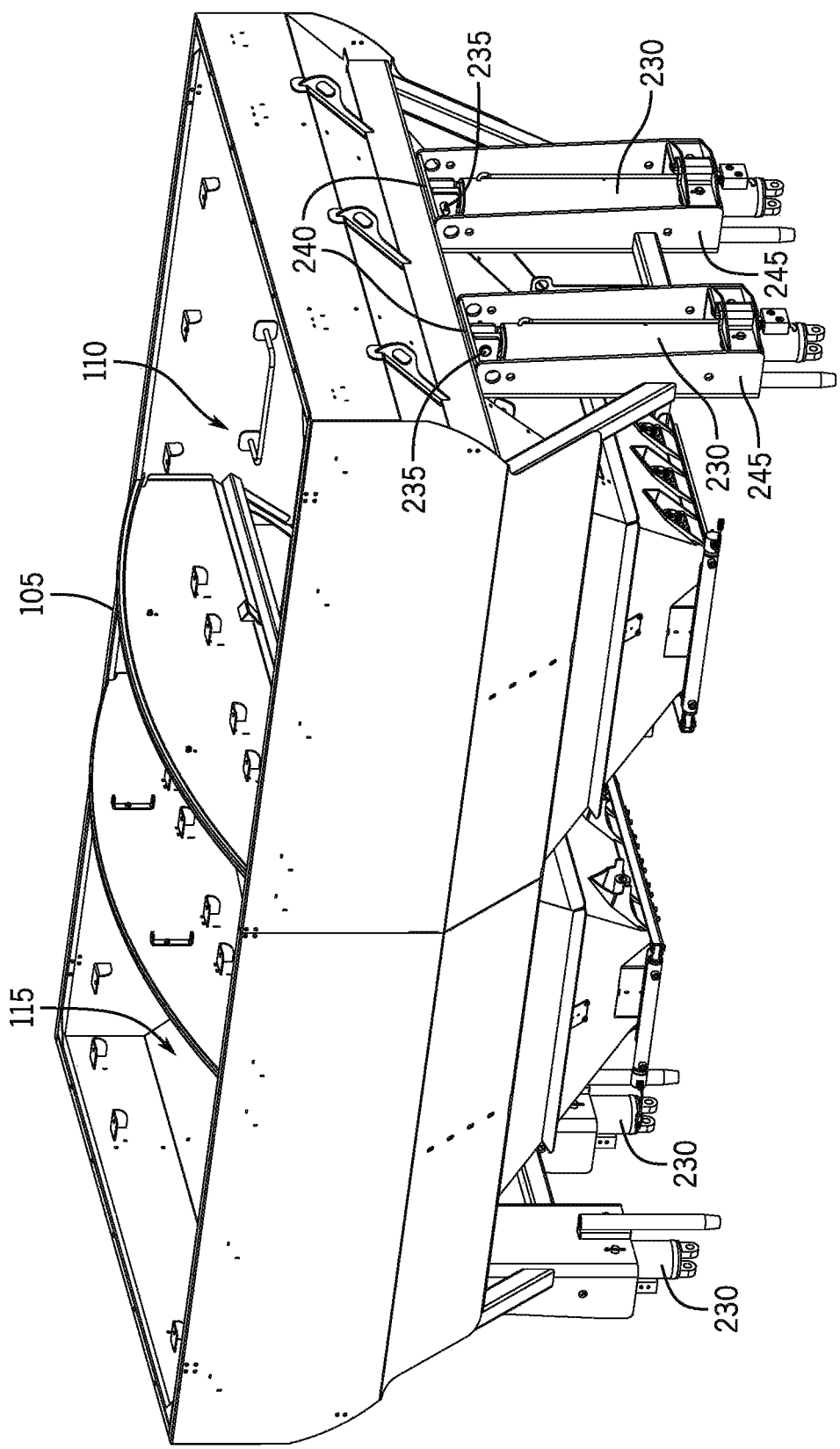
FIG. 5 is an isometric view of portions of a bin of the agricultural product delivery applicator of the implement in FIG. 1 with the bin of the application in a first, lowered position.
Figure 6:
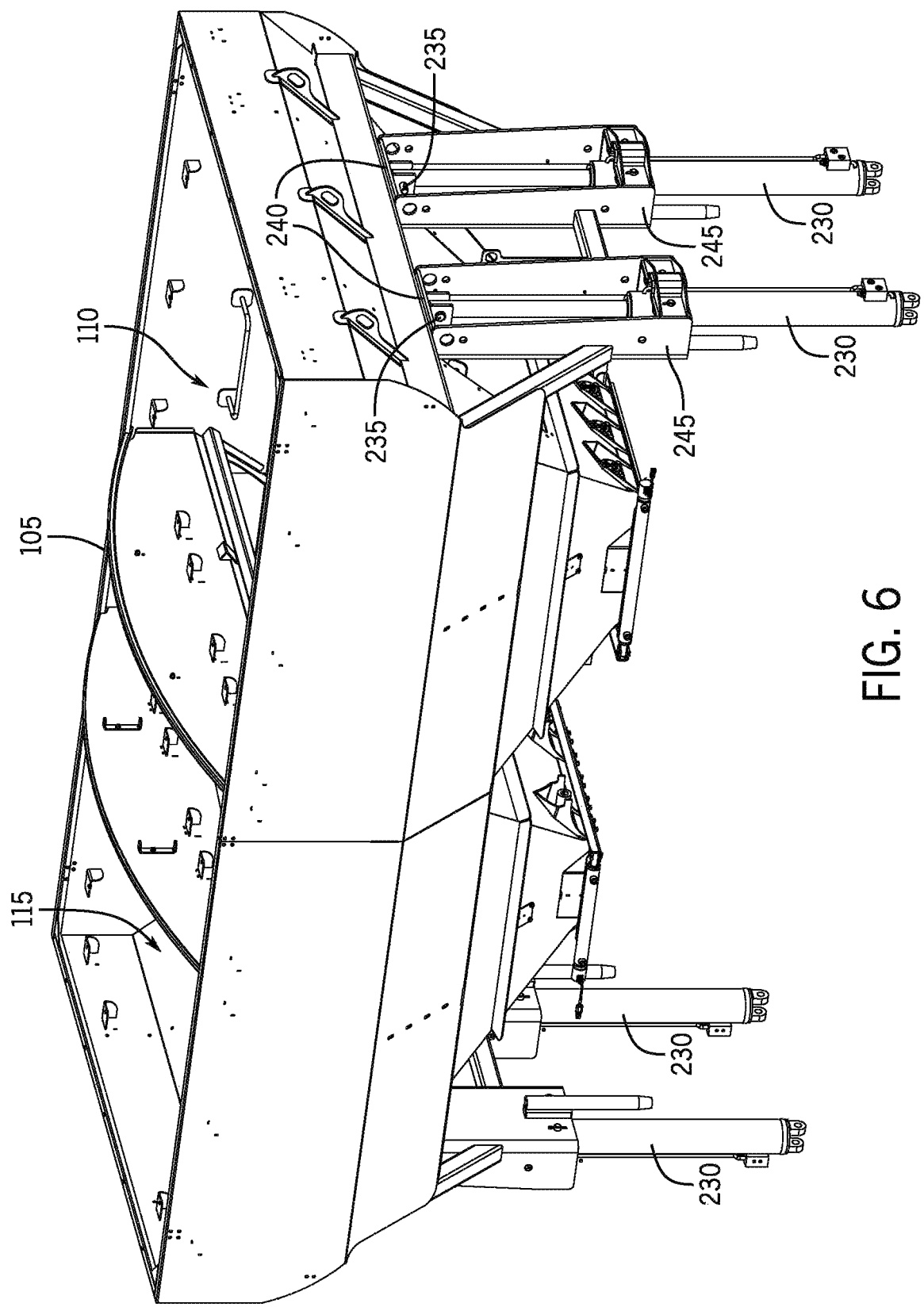
FIG. 6 is an isometric view of portions of a bin of the agricultural product delivery applicator of the implement in FIG. 1 with the bin of the application in a second, raised position.
Figure 7:
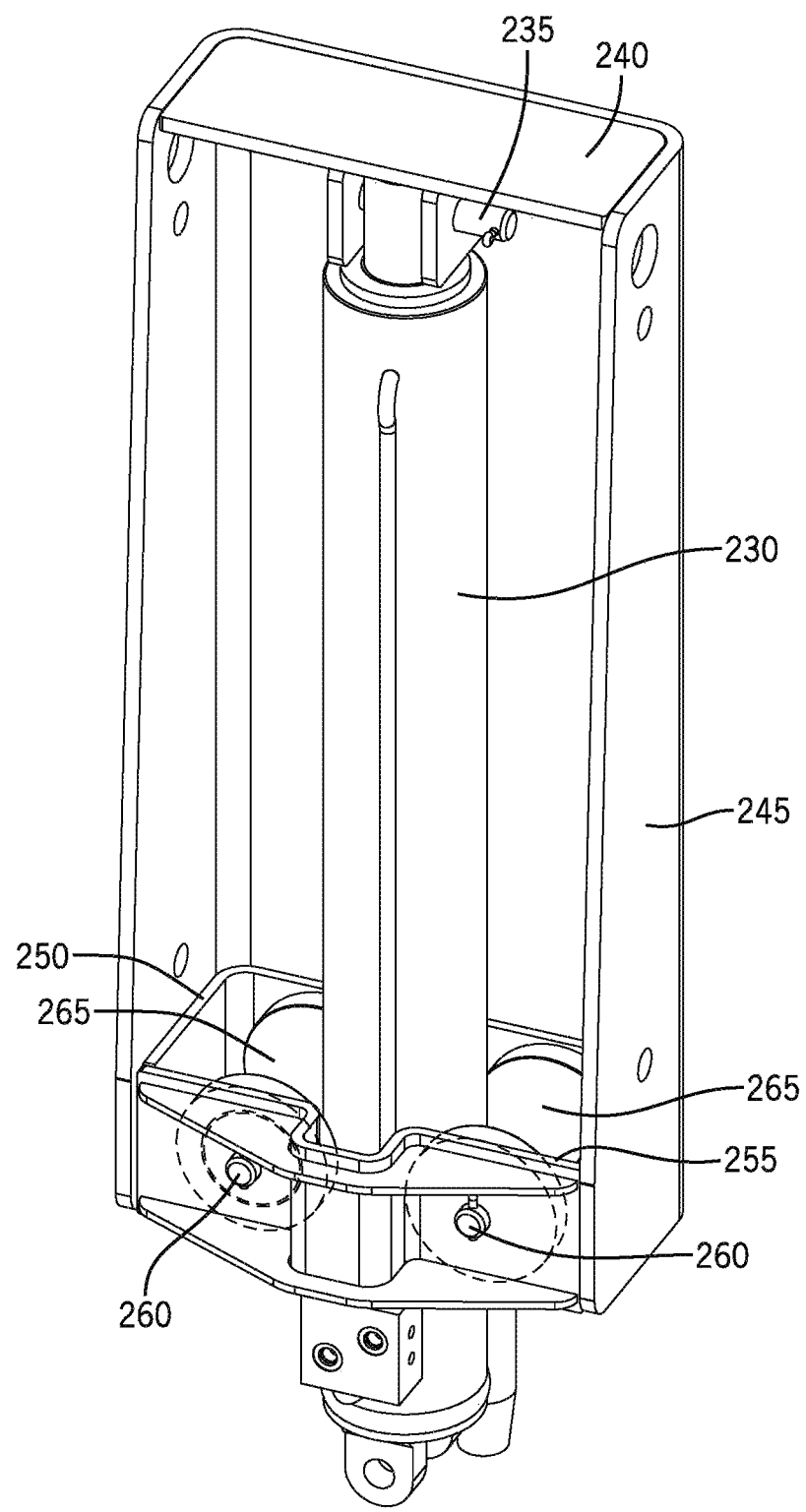
FIG. 7 is an isometric view of a hydraulic cylinder in its environment in the first lowered position of FIG. 5.

Referring now to FIGS. 5 and 6, four hydraulic cylinders 230 couple the bin 105 to the frame 22. Each cylinder 230 is held in place by respective fasteners (fasteners 235 are shown). For example, the fasteners can be the cylinders 230 having apertures that receive mounting bolts, which are secured to the bin 105 or frame 22 by brackets or mounts (e.g., mounts 240 are shown). U-shaped safety brackets 245 can be used to further help align the cylinders and provide support when in various positions. As best shown in FIG. 7, the safety brackets 245 include bearing 250 to help align the cylinder 230, while supporting movement of the cylinder 230 within the safety bracket. The bearing 250 has a housing 255, shafts 260, and spindles 265.

FIG. 5 shows the bin 105 in a first or lowered position. When in this position, the bin 105 and metering system 180 can interact to meter product from the compartments 110 and 115 into the delivery lines 120, 125, and 127. FIG. 6 shows the bin 105 in a second or raised position. When in this position, an operator or maintenance person can access the underside of the bin 105, and the metering system 180 and the pneumatic conveying system 25 underneath the bin 105. The shown construction raises the bin 105 in parallel, thereby allowing all cylinders 230 to share the load equally and eliminating the possible impacts of binding. By equally sharing the load, the cylinders 230 can be designed smaller and decrease cost of the system.

Figure 8:
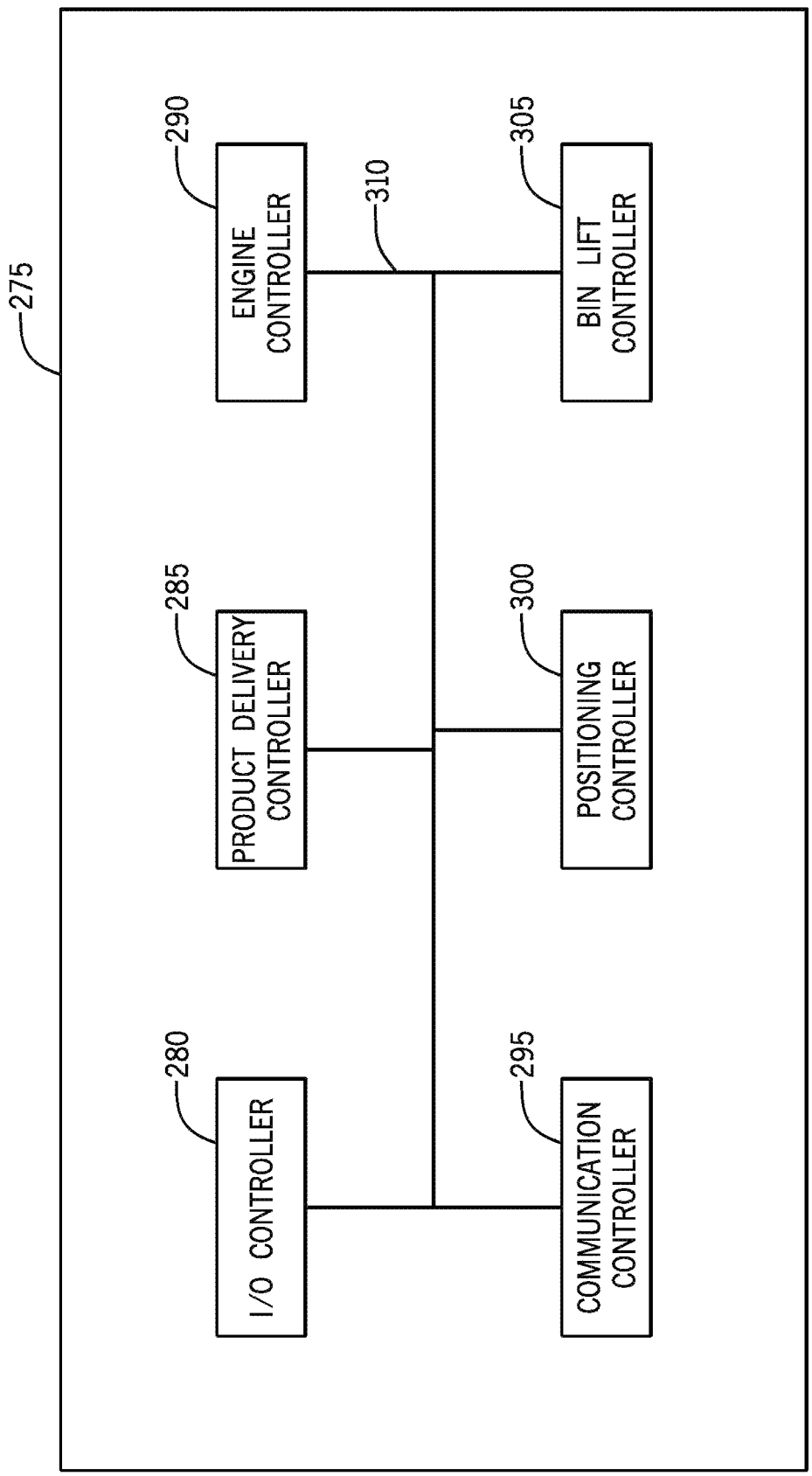
FIG. 8 is a block diagram representing an implement control system for the agricultural application implement in FIG. 1.

FIG. 8 shows a portion of an implement control system 275 capable of being used in the implement 10. The implement control system 275 includes a plurality of processor based control modules (also referred to as control units or controllers), each of which controls an aspect of the implement 10. Exemplary controllers include an input/output (I/O) controller 280, product delivery controller 285, engine controller 290, communication controller 295, positioning controller 300, and bin lift controller 305. Other controllers known in the art may be included with the implement. Other example controllers include a transmission controller, vehicle monitoring and status controller, climate controller, boom folding controller, boom height controller, etc. The controllers 280-305 are coupled together via a communication bus 310. Example functions performed by each controller include the following: the input/output (I/O) controller 280 provides outputs to and receives inputs from the operator; the product delivery controller 285 controls the delivery of product to and through the pneumatic conveying system; the engine controller 290 monitors and controls the engine, the communication controller 295 transmits and receives communication from and to the agricultural implement, the positioning controller 300 receives and/or determines position information for the agricultural implement, and the bin lift controller 305 controls the lifting and lowering of the bin 105. The bin lift controller 305 is discussed in more detail herein. The other controllers referred to herein can be conventional controllers as is known in the art.

Figure 9:
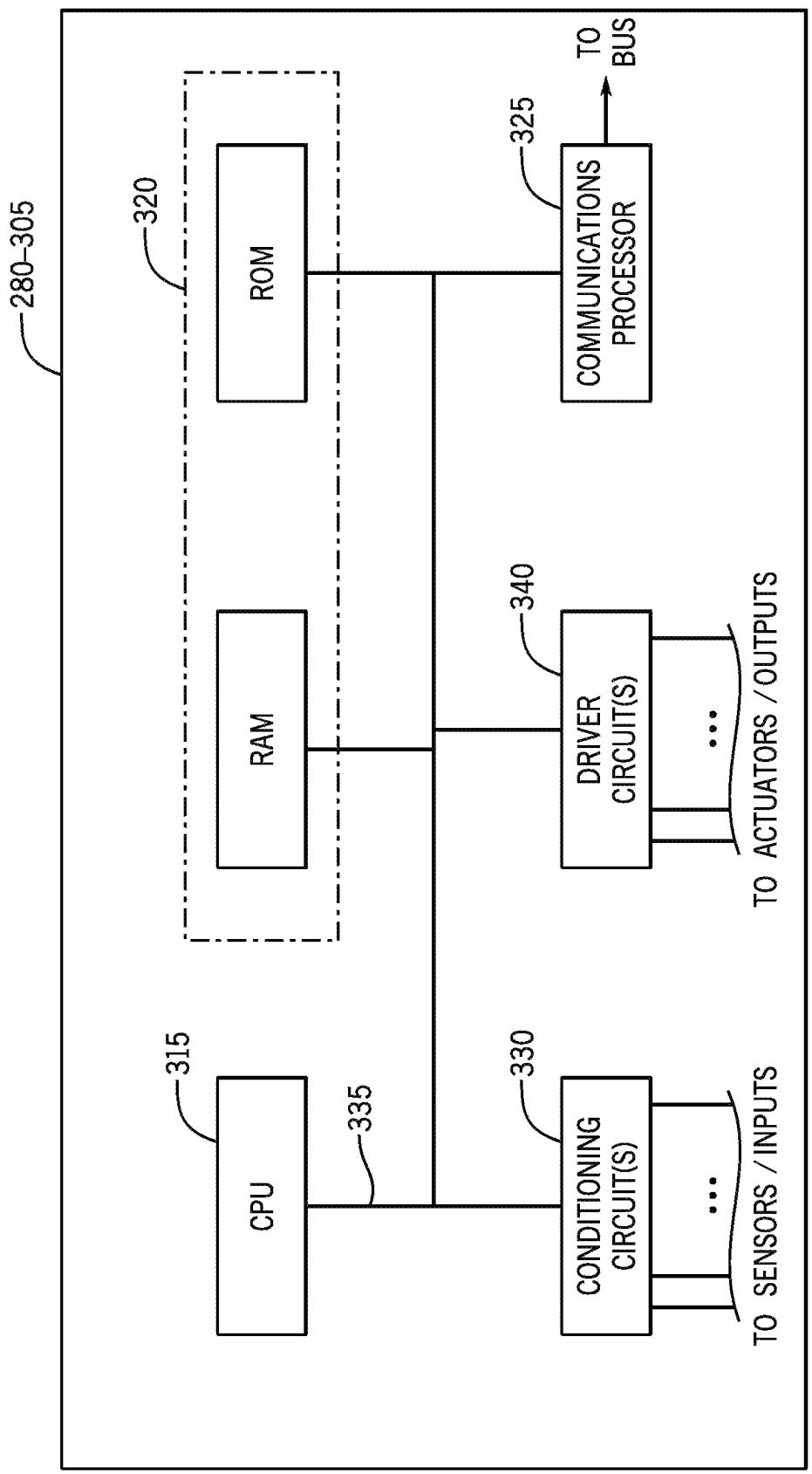
FIG. 9 is a block diagram representing an exemplary controller of those shown in FIG. 7.

FIG. 9 illustrates an exemplary controller of those shown in FIG. 8. Each controller 280-305 includes a processor 315 and memory 320, as well as a communications processor 325 configured to handle all communications over bus 310 with the other controllers 280-305 on the bus 310.

Each controller 280-305 can also include a conditioning circuit 330 that interfaces sensor signals and/or other input (e.g., external communication) to bus 335. Conditioning circuit 330 filters and buffers the signals to eliminate noise, and may include sample-and-hold sub-circuits as well as analog-to-digital converters for processing analog sensor signals.

In addition, each controller 280-305 can include a driver circuit 340 that controls the application of power to actuators and/or other output (e.g., external communication). The processor 315, memory 320, conditioning circuit 330, driver circuit 340, and communications processor 325 are all coupled together by control/data/address bus 335 within each controller 280-305.

The memory 320 can include a RAM and a ROM. The RAM is used to store working variables required by the processor 315. The ROM contains programmed instructions that control the operation of the processor 315. It is envisioned that one or more elements (e.g., the processor 315 and the memory 320) can be combined as is well known in the art.

With respect to the bin lift controller 305, the conditioning circuit(s) 330 can receive sensor/inputs from a bin position sensor, a bin angle sensor, and a chassis angle sensor. The driver circuit(s) 340 can drive or control an extend or retract driver, and control hydraulic fluid to/from the cylinders 230 (e.g., via respective PWM hydraulic drivers or ON/OFF solenoid valves). The communications processor 325 can communicate with other controllers to receive and transmit communication from/to the operator (e.g., via the I/O controller 280), and communication related to the vehicle (e.g., a vehicle speed and whether a "park" brake is active for the vehicle). Other inputs, outputs, and communication are possible depending on the operation of the bin lift controller 305. Further, while the bin lift controller 305 is described herein as a distinct controller, the controls, functions, and operations can be incorporated in other controllers. Also, it is envisioned that some of the inputs received and outputs provided from the bin lift controller 305 can occur via communication via the communications processor 325. For example, rather than receiving angular position information from an attached sensor, the information may be obtained from another controller via the communications processor 325.

Figure 10:
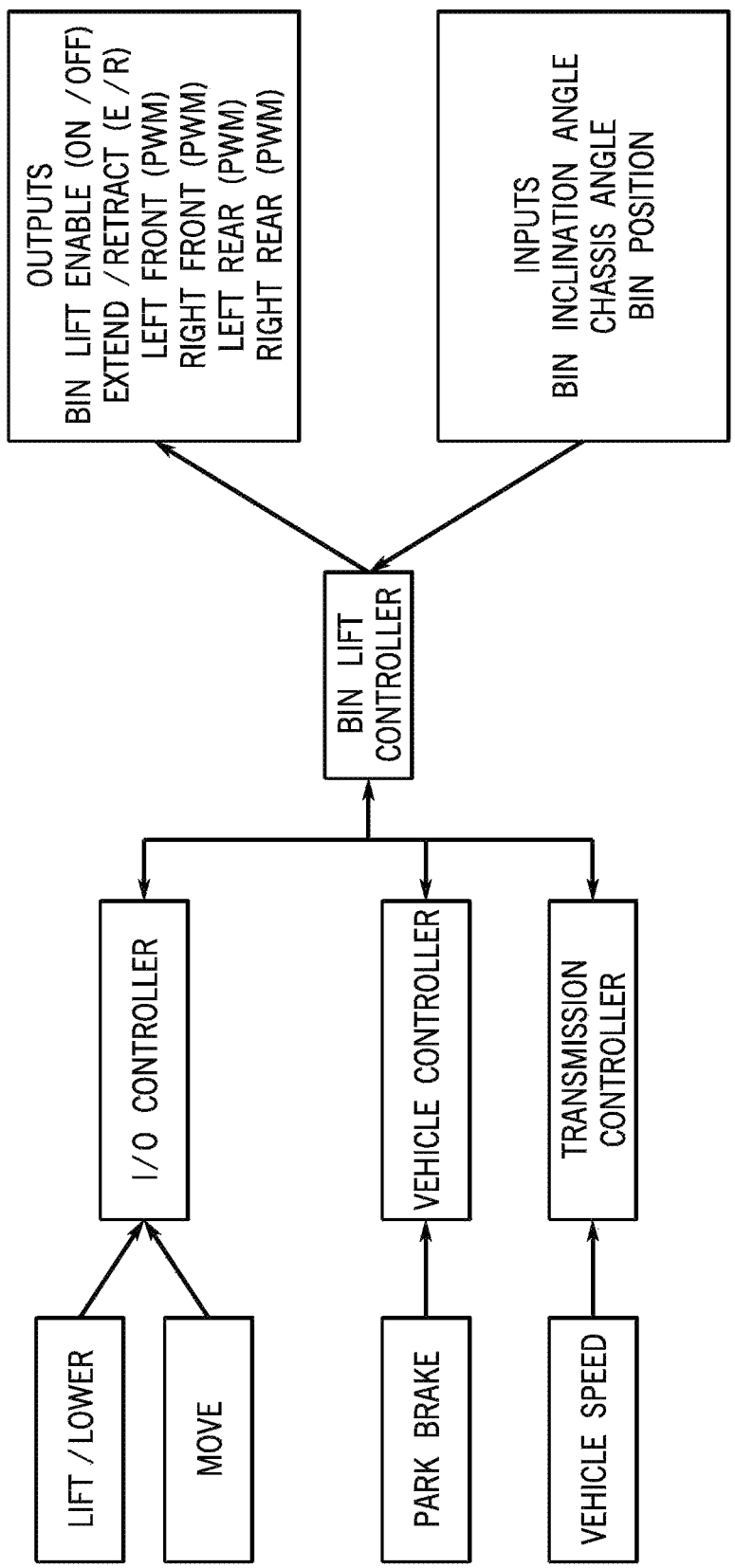
FIG. 10 is a block diagram representing an exemplary control to lift and lower a bin of the implement in FIG. 1.

In one implementation of FIG. 10, a first sensor is coupled to a moving structure (e.g., the bin 105) and a second sensor is coupled to a stationary structure (e.g., the chassis or frame 22). The first and second sensors can be angle sensors, such as inclinometers, gyroscopes, and/or accelerometers. The first and second sensors provide signals to the controller 305, and more specifically the processor 315, ensuring the bodies of both structures (e.g., the bin 105 and the frame 22) remain in mostly parallel planes. The first and second sensors can be uni-axis sensors or multi-axes sensors.

The first sensor attached to the bin 105 can be an accelerometer for determining roll and pitch of the bin 105. The second senor attached to the frame 22 can be an accelerometer for determining roll and pitch of the frame body. The bin lift controller 305 receives the four values from the first and second sensors. To lift or raise the bin 105, the bin lift controller 305 can first determine whether the implement 10 is parked (e.g., via communication from one of the other controllers) and is on level ground. As used herein, "on level ground" can mean that the implement 10 or applicator 15 is on an inclination less than a maximum inclination. Other conditions (e.g., no fan operation, no metering operation) may be required before lifting the bin 105.

If all the conditions are met, the bin lift controller 305 may respond to an operation by the operator. The operation can be to raise or lower the bin and be via the I/O controller 280. The bin lift controller 305 can use information from the bin position sensor to determine whether raise operation is possible. For example, if the bin 105 can move from a lowered to raised position and the bin 105 is at the lowered position, then the bin 105 can only by lifted. In one implementation, the operator can provide a desired direction of movement (e.g., raise or lower) and an operation (e.g., cause movement). The bin position sensor may also prevent the vehicle from being operated in an unsafe condition, such as preventing high travel speed operation when the bin is not in the lowered position.

To raise or lower the bin, the bin lift controller 305 may first enable hydraulic control and flow by use of a bin lift enable hydraulic valve. Next, the bin lift controller 305 may control the flow of hydraulic fluid to allow extension or retraction of the cylinders 230 through an extend/retract switch or virtual switch on an I/O controller 280 touch screen. The bin lift controller 305 then independently controls each cylinder 230 through the use of a respective PWM control valve for each cylinder 230. As part of the process, the bin lift controller 305 continuously monitors the first and second sensors to determine whether the bin 105 and the frame 22 are in parallel. As used herein, "in parallel" can mean that the comparison between the bin 105 and the frame 22 is within a maximum variation from being parallel. If the comparison is beyond the maximum variation, then the bin lift controller 305, at a minimum, stops the lifting or lowering process. Also, as the bin lift controller 305 detects some variation from being absolute parallel, the bin lift controller 305 can vary the PWM control to increase/decrease the speed of extension/retraction of one or more cylinders 230 to bring the bin 105 and the frame 22 back towards absolute parallel.

The bin lift controller 305 can also provide information to the other controllers. For example, the bin lift controller 305 can communicate that the bin 105 is not in the lowered position, thereby preventing the implementation 10 from moving.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. An agricultural application implement for delivering particulate product to a field, the implement comprising:
    a frame;
    a bin to hold product;
    a pneumatic conveying system fixed to the frame, the pneumatic conveying system comprising:
        an airflow source to provide an airflow, and
        a delivery line operably connected to the airflow source and to the bin, the delivery line including a plurality of outlets; and
    a metering system operably connected between the bin and the pneumatic conveying system, the metering system to meter product with the airflow to result in a mixed flow of airflow and product for the delivery line; and
    a bin lift system comprising:
        a first hydraulic cylinder and a second hydraulic cylinder operably coupled with a forward portion of the bin, the first hydraulic cylinder configured to extend or retract independently of the second hydraulic cylinder;
        a third hydraulic cylinder and a fourth hydraulic cylinder operably coupled with a rearward portion of the bin, the third hydraulic cylinder configured to extend or retract independently of the fourth hydraulic cylinder;
        four fasteners respectively coupling each of the first hydraulic cylinder, the second hydraulic cylinder, the third hydraulic cylinder, and the fourth hydraulic cylinder to the bin, wherein the fasteners define a pivot axis that is perpendicular to the direction of travel of the implement; and
        a bin lift controller to control the four hydraulic cylinders to raise or lower the bin.

2. The implement of claim 1, wherein the bin lift system further comprises a first sensor fixed with respect to the frame, and a second sensor supported by the bin, and wherein the bin lift controller controls the four hydraulic cylinders based on a first signal from the first sensor and a second signal from the second sensor.

3. The implement of claim 2, wherein the bin lift controller independently controls the four hydraulic cylinders based on the first signal and the second signal.

4. The implement of claim 2, wherein the bin lift controller independently controls the four hydraulic cylinders to have the bin be parallel with the frame based on the first signal and the second signal.

5. The implement of claim 2, wherein the first sensor includes a first angle sensor, and the second sensor includes a second angle sensor.

6. The implement of claim 2, wherein the first sensor includes a first multi-axes angle sensor, and the second sensor includes a second multi-axes angle sensor.

7. The implement of claim 1, further comprising four brackets supporting the four hydraulic cylinders, each bracket of the four brackets comprising a respective bearing, wherein each hydraulic cylinder of the four hydraulic cylinders moves with respect to one of the respective bearings.

8. The implement of claim 7, wherein each bracket of the four brackets includes a housing, a first spindle coupled to the housing, and a second spindle coupled to the housing, and wherein the first and second spindles allow movement of the bracket with respect to one of the four hydraulic cylinders.

9. A method of moving a bin of an agricultural application implement, the method comprising:
    metering a product with an airflow to result in a mixed flow of airflow and product;
    receiving an input to raise or lower the bin;
    determining a position of the bin;
    determining a position of a stationary portion of the implement; and
    controlling a bin lift system to move the bin in a parallel relationship with respect to a frame of the implement by moving a first hydraulic cylinder of the bin lift system a first extension or retraction distance and a second hydraulic cylinder of the bin lift system a second extension or retraction distance, wherein the first distance is varied from the second distance, and wherein a first fastener operably couples the first hydraulic cylinder to the bin and a second fastener operably couples the second hydraulic cylinder to the bin, the first fastener and the second fastener each defining a pivot axis that is perpendicular to the direction of travel of the implement.

10. The method of claim 9, further comprising determining a speed of the implement, and wherein the controlling the first hydraulic cylinder and the second hydraulic cylinder occurs when the implement is stationary.

11. The method of claim 9, further comprising determining whether the implement is parked, and wherein the controlling the first hydraulic cylinder and the second hydraulic cylinder occurs when the implement is parked.

12. The method of claim 9, further comprising determining a position of the bin with respect to the stationary portion, and wherein the controlling the first hydraulic cylinder and the second hydraulic cylinder comprises raising the bin when the position of the bin is less than a maximum position.

13. The method of claim 9, further comprising determining a position of the bin with respect to the stationary portion, and wherein the controlling the first hydraulic cylinder and the second hydraulic cylinder comprises lowering the bin when the position of the bin is above a minimum position.

14. The method of claim 9, wherein determining a position of the bin includes sensing an angular position of the bin, wherein determining a position of the stationary portion includes sensing an angular position of the stationary portion.

15. The method of claim 14, wherein controlling the first hydraulic cylinder and the second hydraulic cylinder includes varying the control of the first hydraulic cylinder and the second hydraulic cylinder based on the angular position of the bin and the angular position of the stationary portion to move the bin towards the parallel relationship with respect to the stationary portion of the implement.

16. The method of claim 14, wherein controlling the first hydraulic cylinder and the second hydraulic cylinder includes varying a pulse-width-modulated control of one or more of the first hydraulic cylinder and the second hydraulic cylinder.

17. The method of claim 9, further comprising preventing an engine speed of the implement from increasing above a set engine speed when the position of the bin is above a maximum position.

18. The method of claim 9, further comprising preventing a transmission of the implement from shifting out of a first gear when the position of the bin is above a minimum position.

19. A method of moving a bin of an agricultural application implement, the method comprising:
   receiving an input to raise or lower the bin, wherein the bin defines one or more compartments for carrying product to be distributed to through a boom to a field;
   determining a position of the bin;
   determining a position of a stationary portion of the implement; and
   controlling a bin lift system to move the bin, wherein the bin lift system includes a first hydraulic cylinder operably coupled with a forward portion of the bin, a second hydraulic cylinder operably coupled with a forward portion of the bin, a third hydraulic cylinder operably coupled with a rearward portion of the bin, or and a fourth hydraulic cylinder operably coupled with a rearward portion of the bin, wherein a respective fastener operably couples the first hydraulic cylinder, the second hydraulic cylinder, the third hydraulic cylinder, and the fourth hydraulic cylinder to the bin, wherein the fasteners each define a pivot axis that is perpendicular to the direction of travel of the implement, and wherein controlling the movement of the bin alters a distance between a portion of the bin and the boom.

\* \* \* \* \*